Aug. 26, 1969          R. R. SISLER          3,463,285
ELECTRIC CLUTCH WITH SPEED CONTROL
Filed April 22, 1968

INVENTOR.
ROBERT R. SISLER
BY
HIS ATTORNEY

United States Patent Office 3,463,285
Patented Aug. 26, 1969

3,463,285
ELECTRIC CLUTCH WITH SPEED CONTROL
Robert R. Sisler, Louisville, Ky., assignor to General
Electric Company, a corporation of New York
Filed Apr. 22, 1968, Ser. No. 723,085
Int. Cl. F16d 23/10, 43/24
U.S. Cl. 192—104 4 Claims

ABSTRACT OF THE DISCLOSURE

An electromagnetic friction clutch for a washing machine including an electric speed control mounted in a housing attached to a driving motor adjacent the clutch and including means sensing the speed of the clutch output for regulating a coil on the clutch input. Brushes extend between the housing and clutch. A centrifugally engaged clutch is connected between the motor and electromagnetic clutch. The speed control includes trim means for adjusting prior to installation.

BACKGROUND OF THE INVENTION

The present invention relates to an improved drive control assembly for use in washing machines and, more particularly, to such an assembly utilizing an electro-magnetic clutch. The use of electro-magnetic clutches with automatic washing machines provides an efficient, reliable and low cost means for enabling the user to have a very wide selection of operational speeds to suit various loads. With prior art machines of this type, the motor, the clutch and the controls have been mounted in the machine separately. Quite often all of the control mechanism is placed in the backsplash, along with the usual customer selection devices. Such drive control assembly procedures are relatively cumbersome and make it necessary to completely assemble the machine before the drive control assembly can be tested, and adjusted if necessary.

An object of the present invention is to provide an improved drive control assembly for use in a washing machine.

Another object of this invention is to provide such an improved drive control assembly which is preassembled and mounted in a washing machine as a unitary structure.

SUMMARY OF THE INVENTION

A drive control assembly for use in an automatic washing machine includes a drive motor having an output shaft extending therefrom. An electro-magnetic clutch assembly is mounted on the shaft for rotation thereby and is effective to provide an output torque responsive to a signal applied to the clutch assembly. A control package is mounted in juxtaposition to the clutch assembly and includes a pickup positioned adjacent the output portion of the clutch assembly to generate therewith a signal responsive to the speed of the output portion. The control package also includes a control circuit for modifying the generated signal to develop a signal responsive to the generated signal for application to the clutch assembly. Brushes extend between the control circuit and the input portion of the clutch assembly to apply the developed signal to the clutch assembly. A substantially liquid-proof housing encloses the control circuit, with the brushes extending therefrom.

DESCRIPTION OF THE PREFERRED EMBODIMENTS

Figures 1, 2:
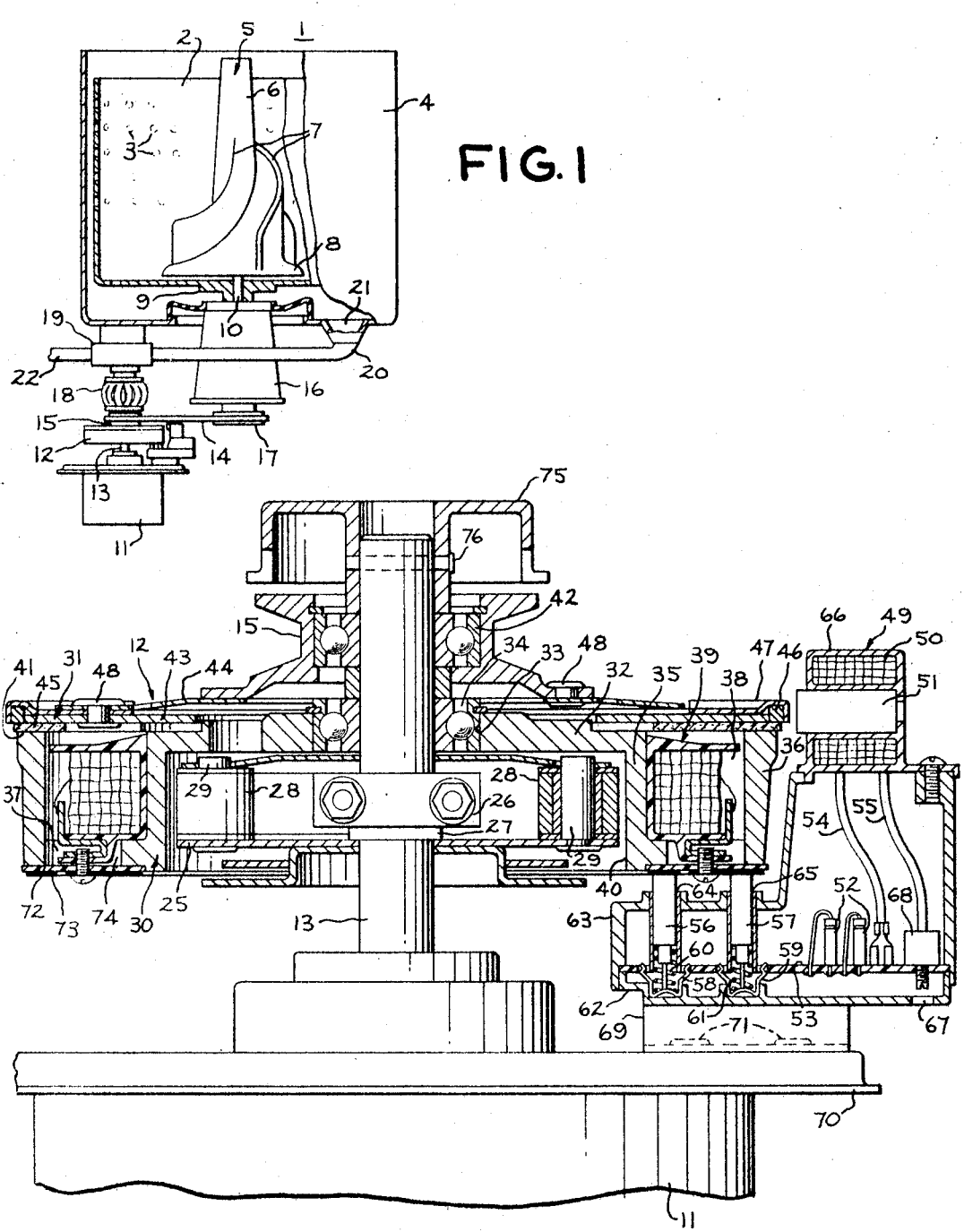
FIGURE 1 is a partial schematic front elevational view of a clothes washing machine utilizing a drive control assembly in accordance with one embodiment of this invention.
FIGURE 2 is a fragmentary side elevational view of the drive control assembly of FIGURE 1, the assembly being partially broken away and partially in section to illustrate details.

Referring now to FIGURE 1 of the drawing, there is shown, in schematic form, an agitator type washing machine adapted to utilize a new and improved drive control assembly in accordance with one form of the present invention, the machine being generally indicated by the numeral 1. Machine 1 includes a clothes basket 2 having perforations 3 over its side and bottom walls and disposed within an outer imperforate tub or casing 4, the basket 2 and tub 4 forming together fluid and clothes containing means. The entire structure generally is mounted within a suitable appearance and protective cabinet which, in this case, has been omitted for purposes of clarity.

At the center of the basket 2 there is provided a vertical axis agitator 5 which includes a center post 6 and a plurality of curved vanes 7, extending out from the center post and connected together at their base by a flared skirt 8. Both the basket 2 and agitator 5 are movably mounted. Conventionally the basket is mounted for rotation and the agitator is mounted for some type of oscillatory movement which will effect agitation of the fabrics and the fluid within the basket. In one conventional structure the basket 2 may be secured to a hollow shaft 9 and the agitator may be secured to a shaft 10 which extends up within the shaft 9 in rotatable relationship thereto.

Basket 2 and agitator 5 are driven by a power means such as a conventional reversible drive motor 11 through a drive including an electro-magnetic clutch 12 mounted on the motor shaft 13. A suitable belt 14 transmits power from the output hub or pulley 15 of the clutch to a transmission assembly 16 through a pulley 17. Thus, depending upon the direction of motor rotation, the pulley 17 of transmission 16 is driven in opposite directions. Transmission 16 is so arranged that it supports and drives both shafts 9 and 10. When motor 11 is operated in one direction, the transmission causes agitator 5 to be oscillated through shaft 10. Conversely, when the motor is driven in the opposite direction, the transmission drives basket 2 and agitator 5 together at high speed through shafts 9 and 10 for centrifugal extraction of fluids from the fabrics.

In addition to operating transmission 16 through clutch 12, as described, motor 11 also provides a direct drive through a flexible coupling 18 to a pump structure generally indicated at 19. Pump 19 has an inlet which is connected by a conduit 20 to an opening 21 formed in the lower most portion of tub 4, and an outlet, which is connected by a conduit 22 to a suitable drain (not shown). When motor 11 is rotated in a direction to cause the basket 2 and agitator 5 to be rotated for centrifugal fluid extraction, the pump 19 is effective to withdraw fluid from tub 4 through opening 21 and discharge it through conduit 22 to drain. When the motor is operated in the other direction, that is to cause agitator 5 to be oscillated for agitation of fabrics within the fluid, the pump 19 is substantially ineffective.

In operation, the machine 1 is provided with an amount of water of suitable temperature through a conventional water supply mechanism (not shown). The motor 11 is then caused to rotate so as to result in agitator 5 being oscillated to cause fabrics in the machine to be agitated within the fluid. Thereafter motor 11 is reversed so as to cause agitator 5 and basket 2 to be rotated at high speed for centrifugally extracting fluid from the fabrics. At the same time pump 19 is rotated so as to remove vitiated fluid from the tub 4 and hence from the basket 2. This sequence of operation may be repeated a number of times; conventionally it is done at least three times to provide a prewash step, a wash step and a rinse step. Particular controls for providing such parameters is the number of steps, length of steps, variations in water temperature and automatic dispensing of such items as detergents, bleaches and rinse agents are quite conventional and form no part of the present invention. Therefore, they have been omitted for the sake of simplicity.

Referring now particularly to FIGURE 2, there is shown in more detail an improved drive control assembly for use in a machine such as the one illustrated in FIGURE 1. The clutch mechanism 12 includes a carrier plate or drive mechanism 25 which is attached to the output shaft 13 of motor 11 for rotation therewith. The carrier plate 25 is a generally radially extending, oblong member which may be secured to the shaft 13 by any suitable means, and is shown in FIGURE 2 as being secured to the shaft by means of a clamp 26. Specifically the carrier plate 25 is provided with an axially extending hub 27 and the clamp 26 clamps the hub 27 securely to the shaft 13.

The carrier plate 25 has mounted on it a pair of speed responsive or centrifugally operated clutch shoes 28 which are pivotally mounted on the drive mechanism 25 by pins 29 so that the clutch shoes pivot outwardly as the motor output shaft, and thus the drive mechanism, comes up to the operational speed of the motor 11. As the clutch shoes pivot outwardly they engage an intermediate, independently rotary clutch input structure 30. This input structure, as is explained hereinafter, is effective to drive an adjacent, rotary clutch output structure 31 with a variable torque transmitting capability therebetween.

The input structure includes a first or inner, generally radially extending wall 32 provided with a central aperture 33. A bearing structure 34 is mounted within the aperture 33 and about the output shaft 13 so that the input structure can rotate relative to the shaft. At the radially outer edge of the wall 32, the input structure is formed with an inner, axially extending wall 35. The inner, axially extending wall is joined to an outer, axially extending wall 36 by an outer, radially extending wall 37, which is axially offset from the inner, radial wall 32. Thus the walls 35, 36 and 37 form an annular recess or cavity 38 to receive an electro-magnetic actuating coil structure, generally indicated at 39. Also, the radially inner surface 40 of the wall 35 forms a contact service for engagement by the clutch shoes 28 so that, as the drive mechanism 25 is brought up to speed by the output shaft 13 of the motor, the clutch shoes will engage the wall 40 and drive the input structure 30 at motor speed. The edge of the outer, axial wall 36 forms a clutching surface 41 for cooperation with the output structure 31.

The output structure includes the pulley or hub 15, which is mounted on the output shaft 13 by means of a bearing structure 42 so that it can rotate relative to the shaft. The output structure also includes an outer, annular clutching member 43 which is mounted in juxtaposition to the clutching surface 41 of the input structure and is connected to the hub 15 by an intermediate member 44. The clutching member 43 is provided with an annular strip of friction material 45 for engaging the clutching surface 41.

With the structure as thus far described, when the actuating coil 39 is energized, a magnetic field is established between the input and output structures. This field causes the clutching member 43 to be attracted toward the input structure 30 and the strip of friction material 45 to be pressed against the clutching surface 41. The input structure then drives the output structure and tends to rotate it at the speed of the motor 11. The torque transmission capability between the input and output structures and thus the speed at which the clutch will drive any particular load, such as the agitator 5 and basket 2, up to full motor speed, can be varied by varying the signal to the coil 39, as is well known in the art.

There is provided a suitable means for generating a signal responsive to the output portion for controlling the signal to the coil 39 to provide a predetermined output speed. A strip of magnetic material 46 is mounted on the outer edge of the clutching member 43 by means of an annular connector 47 which fits around the strip 46 and holds it securely against the edge of the clutching member 43. The connector in turn is attached to the clutching member 43 by any suitable means such as a number of rivets 48 which extend through appropriate openings in the connector and intermediate member so as to securely connect these two members together. Similar rivets 48 attach the intermediate member 44 to the hub or pulley 15 so that the hub, intermediate member, clutching member, magnetic strip and connector form a unitary structure.

The magnetic strip 46 is provided around its circumference with alternate north and south magnetic poles. As the output structure rotates these alternate poles are rotated past a tachometer pickup or generator generally indicated at 49. The generator includes a coil 50 which is wound around an armature 51 and is incapsulated in a suitable potting material. As the output structure rotates the alternate poles are rotated past the armature 51. This causes a voltage to be induced in the coil 50 to develop a signal responsive to the speed of the output portion.

This signal is fed to a control circuit for modifying the generated signal to develop a suitable signal responsive to the generated signal for application to the clutch actuating coil. The particular circuit may be formed by a number of elements such as the electronic components indicated at 52, which are mounted on an insulated board 53 and electrically joined by conductors which are printed or deposited on the board. The electrical characteristics of one such suitable circuit is described and claimed in copending application Ser. No. 608,559 of Donald S. Heidtmann, filed Jan. 11, 1967, and assigned to the General Electric Company, assignee of the present invention. Leads 54 and 55 connect the generator wth the appropriate portion of the control circuit. The modified signal provided by the control circuit is applied across a pair of carbon brushes 56 and 57, which are electrically connected to the circuits and physically mounted to the circuit board to be spring biased in an upward direction therefrom. To accomplish this a pair of cup member 58 and 59 are connected in suitable openings in the board 53 with one of a pair of wound springs 60 and 61 being received between each cup and a corresponding brush.

The circuit board with its various elements, including the brushes, is received in a housing including a lower member 62 and an upper member 63 which snap together to form a substantially liquid-proof housing around the control circuit. The upper member 63 includes a pair of openings 64 and 65 which fit closely around the brushes 56 and 57 respectively. The coil 50 is placed in a housing 66 which snap fits into an appropriate opening in the top of the upper housing 63 to close off the top of the housing and complete the liquid-proof housing. It will be recognized that this housing need be only substantially liquid-proof, since in fabric washing machines these elements are not submerged in any liquid and there is merely the possibility of some liquid such as water or oil being splashed on them.

There may be an opening as indicated at 67 on the underside of lower member 62 to provide access to an adjustable component or trim means 68 of the control circuit, such as an adjustable resistance, so that the characteristics of the control circuit may be adjusted to provide the desired output speed in response to a given voltage generated by the magnetic strip 46 and generator 49.

The lower housing member 62 includes a downwardly extending foot 69 which is attached to a motor cover 70 by some suitable means such as screws as indicated at 71. Thus the drive motor, the electromagnetic clutch, and the control package form a unitary assembly with the control package, and its enclosed control circuit being mounted on the motor and providing support for the tachometer pickup or generator which is mounted in juxtaposition to the magnetic strip. The brushes bear against a pair of slip rings 72 and 73, which are mounted under the radial wall 37. Leads from the coil 39 extend through suitable openings 74 in the wall 37 and are connected to the slip rings 72 and 73, so that the signal applied across the brushes 56 and 57 is applied to the coil.

Additionally, for a machine such as that illustrated in FIGURE 1, a bell 75 is mounted on the upper end of the motor shaft 13 by some suitable means such as the pin 76 so that the bell continuously rotates at motor speed. The flexible drive member 18 is secured to the bell 75 so as to drive the pump 19 substantially at motor speed.

The drive control of the present invention including the drive motor 11, the electro-magnetic clutch 12, and the control package may be assembled separately from the machine and then inserted into an individual machine as a unitary structure at the appropriate time during the manufacturing process. Also, with the drive control assembly as described the pulley 15 may be connected to a suitable test load and the control adjusted to compensate for the variations which will occur in various components from drive control assembly to drive control assembly so that the output characteristics will be uniform from drive control to drive control. Such assembly, testing and required adjustment before assembly into a complete washing machine greatly simplifies the manufacturing process and thus reduces the cost.

The foregoing is a description of an illustrative embodiment of the invention and it is applicant's intention in the appended claims to cover all forms which fall within the scope of the invention.

What I claim as new and desire to secure by Letters Patent of the United States is:

1. A drive control assembly for use in a washing machine, including:
   (a) a drive motor having an output shaft extending therefrom;
   (b) an electro-magnetic clutch assembly mounted on said shaft for rotation thereby and effective to provide an output torque responsive to a signal applied to said clutch assembly;
   (c) a control package mounted in juxtaposition to said clutch assembly, said package including a pickup positioned adjacent the output portion of said clutch assembly to generate therewith a signal responsive to the speed of said output portion; a control circuit for modifying the generated signal to develop a signal responsive to the generated signal for application to said clutch assembly; brushes extending between said control circuit, and the input portion of said clutch assembly to apply the developed signal to said clutch assembly; and a housing enclosing said control circuit with said brushes extending therefrom;
   (d) whereby said drive control assembly can be preassembled and inserted in a washing machine as a unitary structure.

2. The invention as set forth in claim 1 wherein said housing is supported by said motor and provides support for said pickup.

3. The invention as set forth in claim 1 wherein said clutch output portion includes an annularly arranged strip of magnetic material having alternate north and south poles and said pickup includes a coil and armature positioned adjacent said strip to generate a signal responsive to the angular speed of said clutch output, said coil and armature being mounted in a portion of said housing.

4. The invention as set forth in claim 1 wherein said control circuit includes trim means for adjusting said drive control assembly prior to insertion in a washing machine.

References Cited
UNITED STATES PATENTS

| | | | |
|---|---|---|---|
| 3,229,796 | 1/1966 | Worst | 192—104 |
| 3,328,983 | 7/1967 | Brucken et al. | 192—104 X |

BENJAMIN W. WYCHE III, Primary Examiner

U.S. Cl. X.R.

192—48.3, 103, 105; 310—95